United States Patent
Yoo et al.

(10) Patent No.: US 6,771,724 B2
(45) Date of Patent: *Aug. 3, 2004

(54) METHOD AND APPARATUS FOR RECORDING TIME INFORMATION FOR DIGITAL DATA STREAMS

(75) Inventors: Jea-Yong Yoo, Seoul (KR); Byung-Jin Kim, Kyunggi-do (KR); Kang-Soo Seo, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/376,254

(22) Filed: Mar. 3, 2003

(65) Prior Publication Data

US 2003/0133529 A1 Jul. 17, 2003

Related U.S. Application Data

(63) Continuation of application No. 09/410,755, filed on Oct. 1, 1999, now Pat. No. 6,553,086.

(30) Foreign Application Priority Data

Oct. 2, 1998 (KR) .............................................. 98-41937
Feb. 9, 1999 (KR) .............................................. 99-4467

(51) Int. Cl.$^7$ .............................. H04N 5/91; H04N 5/95
(52) U.S. Cl. ......................................... 375/354; 386/83

(58) Field of Search ................................. 375/354, 254; 360/60–100; 386/68, 83–124

(56) References Cited

U.S. PATENT DOCUMENTS

| | | | |
|---|---|---|---|
| 4,011,517 A | 3/1977 | Pommerening et al. | |
| 5,619,337 A | 4/1997 | Naimpally | |
| 6,169,843 B1 | 1/2001 | Lenihan et al. | |
| 6,408,338 B1 | 6/2002 | Moon et al. | |
| 6,445,877 B1 | 9/2002 | Okada et al. | |
| 6,453,116 B1 | 9/2002 | Ando et al. | |
| 6,553,086 B1 * | 4/2003 | Yoo et al. ................... | 375/354 |

* cited by examiner

Primary Examiner—Stephen Chin
Assistant Examiner—Lawrence Williams
(74) Attorney, Agent, or Firm—Birch, Stewart, Kolasch & Birch, LLP

(57) ABSTRACT

A recording medium includes transport stream units recorded therein, wherein the transport stream units are created by adding a transport time reference to each unit of a transport stream, and wherein the transport time reference includes two time fields of different time bases, a smaller-unit time field being reset when a count value reaches a predetermined value and a bigger-unit time field being incremented by 1 when said smaller-unit time field is reset, the count value corresponding to an arrival time of each unit of the transport stream.

7 Claims, 8 Drawing Sheets

*Conventional Art*

| SOB_GI | | |
|---|---|---|
| SOBU_SZ | MINIMUM MAPPING UNIT SIZE | 2 BYTES |
| MTU_SHFT | MAPPING TIME UNIT SHIFT | 1 BYTE |
| RESERVED | RESERVED | 1 BYTE |
| MAPL_ENT_NS | NUMBER OF MAPPING LIST ENTRIES | 4 BYTES |
| S_S_APAT | STREAM START APAT | 8 BYTES |
| S_E_APAT | STREAM END APAT | 8 BYTES |

(a)

| INCREMENTAL APAT | | |
|---|---|---|
| IAPAT | INCREMENTAL APAT | 2 BYTES |

(b)

PAT_base : 90 KHz unit , PAT_ext : 27 MHz unit ( 0 ~ 299 )

PAT : 27 MHz unit

*Conventional Art*

PAT_base : 90 KHz unit , PAT_ext : 27 MHz unit ( 0 ~ 299 )

PAT_base : 90 KHz unit , PAT_ext : 27 MHz unit ( 0 ~ 299 )

METHOD AND APPARATUS FOR RECORDING TIME INFORMATION FOR DIGITAL DATA STREAMS

This application is a continuation if co-pending Application Ser. No. 09/410,755, filed on Oct. 1, 1999, the entire contents of which are hereby incorporated by reference and for which priority is claimed under 35 U.S.C. § 120; and this application claims priority of Application No. 98-41937 filed in KOREA on Oct. 2, 1998 and Application No. 99-4467 filed in KOREA on Feb. 9, 1999 under 35 U.S.C. § 119.

BACKGROUND OF THE INVENTION

1. Field of the Invention

The present invention relates to a method and apparatus for recording and transferring time information for digital data streams. A digital data stream is recorded on a recording medium along with the time information thereof and thus every packet stream unit has the time information of its own. The time information is used for searching the recording medium for a specific packet stream unit requested by a user and maintaining a precise timing for transferring packet stream units through a digital interface to an external apparatus.

2. Description of the Related Art

In conventional analog television broadcast, video signals are transmitted over the air or through cables after being AM or FM modulated. With the recent rapid advance of digital technologies such as digital image compression or digital modulation/demodulation, standardization for digital television broadcast is in rapid progress. Based upon the Moving Picture Experts Group (MPEG) format, satellite and cable broadcast industry also moves towards digital broadcast.

Digital broadcast offers several advantages that its analog counterpart cannot provide. For example, digital broadcast is capable of providing services with far more improved video/audio quality, transmitting several different programs within a fixed bandwidth, and offering enhanced compatibility with digital communication media or digital storage media.

In digital broadcast, a plurality of programs encoded based upon the MPEG format are multiplexed into a transport stream before transmitted. The transmitted transport stream is received by a set top box at the receiver and demultiplexed into a plurality of programs. If a program is chosen from among the demultiplexed programs, the chosen program is decoded by a decoder in the set top box and original audio and video signals are retrieved. The retrieved audio and video signals can be presented by an A/V output apparatus such as a TV.

It is also possible to store the received digital broadcast signals on a storage medium instead of directly outputting the received broadcast signals to A/V output devices. The stored digital broadcast signals can be edited and presented afterwards. For example, a digital data stream received by a set top box can be stored in a streamer such as a digital video disk (DVD) through communication interfaces like an IEEE-1394 serial bus. Later, the stored digital data stream can be edited and transmitted back to the set top box so that the original digital audio and video data can be presented.

When recording the digital data stream of a single program in a streamer, the basic recording unit is the stream object (SOB) comprising a series of stream object units (SOBUs). To record received digital broadcast signals in a streamer and reproduce the recorded signals afterwards, it is necessary to explore how to group and record stream objects (SOBs) and stream object units (SOBUs) and how to create search information for managing and searching for the recorded stream objects (SOBs) and stream object units (SOBUs). Also, it is required to investigate how to search a specific data stream corresponding to a search time requested by a user.

A conventional method for recording digital data streams and creating and recording navigation information will now be explained with reference to the accompanying drawings.

FIG. 1 depicts a block diagram of an apparatus in which the conventional method for creating and recording the navigation information of a digital data stream can be employed. FIG. 2 depicts the process of recording the digital data stream and creating the navigation information in the system shown in FIG. 1. The system comprises a set top box 100, a communication interface (IEEE-1394), and a streamer 200. The set top box 100 receives transport streams encoded by system encoders and broadcast by a plurality of broadcast stations, and demultiplexes the received transport streams. After a decoder 120 decodes the transport stream of a program tuned by a tuning unit 110, a control unit 140 outputs the decoded transport stream to an A/V output apparatus or to the streamer 200 through an IEEE-1394 communication interface 130 and 210 so that the transmitted program can be recorded in the streamer 200, depending upon a user's request. When requested by a user, the streamer 200 retrieves the recorded program and transmits the retrieved program through the IEEE-1394 communication interface back to the set top box 100. In the set top box 100, the received program is decoded by the decoder 120 and outputted to an A/V output apparatus so that the recorded program can be presented.

A control unit 250 in the streamer 200 controls the data stream transmitted from set top box 100 to be recorded as shown in FIG. 2 on a recording medium 230 by a recording stream processing unit 220. The received data stream including transport stream packets is recorded on the recording medium along with the packet arrival time (PAT) of each transport stream packet, wherein the packet arrival time will be used as a time reference for transmitting the associated transport packet in playback. In the streamer 200, the transport stream packets with packet arrival times are organized in sectors with each sector having a predetermined size. A predetermined number of sectors, for example 32 sectors, are grouped into a stream object unit (SOBU). If the recording process is stopped or suspended by a user, the recorded stream object units (SOBUs) are organized into a stream object (SOB). Additionally, navigation data such as the stream start application packet arrival time (S_S_APAT) and incremental application packet arrival time (IAPAT) for searching for and managing the stream object (SOB) and stream object units (SOBUs) is recorded together on the recording medium.

FIG. 3 shows the way the received digital data stream is recorded in the streamer 200. An application packet and a packet arrival time (PAT or time stamp) constitute a transport stream packet (TSP). A plurality of transport stream packets (TSPs) and a header are organized into a sector and a predetermined number of sectors, for example 32 sectors, constitute a stream object unit (SOBU). A series of stream object units (SOBUs) constitutes a stream object (SOB). Meanwhile, the stream object information (SOBI), which is the navigation data for managing and searching for the recorded stream objects (SOBs), comprises a stream object general information (SOB_GI) and a mapping list (MAPL) for managing stream object units (SOBUs), as shown in FIGS. 4 and 5. The stream object general information (SOB_GI) includes the stream start application packet arrival time (S_S_APAT) indicative of the start time of the associated stream object (SOB). As shown in FIG. 2, the incremental packet arrival time (IAPAT), which is a count value counted at constant time intervals (x) between two consecutive stream object units (SOUBs), is included in the mapping list (MAPL) and used as information for searching for the stream object (SOB) and stream object units (SOBUs) afterwards.

The stream start packet arrival time (S_S_APAT) contained in the stream object general information (SOB_GI) is recorded as a 6-byte packet arrival time (PAT) comprising a 9-bit packet arrival time extension (PAT_ext) and 39-bit packet arrival time base (PAT_base), as shown in FIG. 6A. The packet arrival time extension (PAT_ext) is a modulo-300 counter that is incremented at a rate of 27 MHz, whereas the packet arrival time base (PAT_base) is incremented at a rate of 90 kHz. Unlike format of the stream start application packet arrival time (S_S_APAT), the time stamp recorded along with the application packet shown in FIG. 3 is recorded as a 4-byte packet arrival time (PAT), shown in FIG. 6B, that is incremented at a rate of 27 MHz and can represent from 0 s up to 159 s (=2$^{32}$/27 MHz).

The method for searching a digital data stream corresponding to a requested search time using the navigation and time information regarding the stream objects (SOBs) and stream object units (SOBUs) will be explained in detail with reference to an example.

With reference to FIG. 2, suppose that the position (s) of a transport stream packet corresponding to a search time (ST) requested by a user is to be searched for. First, the stream start application packet arrival time (S_S_APAT) contained in the stream object general information (SOB_GI) of each stream object (SOB) is compared with the requested search time (ST) and a stream start application packet arrival time (S_S_APAT) that is closest to but does not exceed the request search time (ST) is detected.

Referring to the mapping list (MAPL) of the stream object SOB #1 corresponding to the detected stream start application packet arrival time (S_S_APAT), the incremental application packet arrival times (IAPAT 1~4) contained in the mapping list (MAPL) are summed up. The sum value is multiplied by the unit time (x) and added to the detected stream start application packet arrival time (S_S_APAT). The procedure is repeated until the calculated value (S_S_APAT+x×Σ IAPAT) approaches the requested search time (ST) without exceeding it. In FIG. 2, the summation and multiplication is repeated to include IAPAT 4 because the calculated value exceeds the search time (ST) if the calculation continues to IAPAT 5. Then the entry in the mapping list (MAPL) corresponding to the calculated time (S_S_APAT+x×Σ IAPAT) is located and the index of the entry is multiplied by the number of sectors constituting a stream object unit (for example, 32 sectors) to locate the desired stream object unit SOBU 5.

From the start position A' of the searched stream object SOBU 5, the 4-byte packet arrival time (PAT), which is the time stamp of the transport stream packet, is detected. Recall that the stream start application packet arrival time (S_S_APAT) and the packet arrival time (PAT) of a transport stream packet have different formats and therefore the two values cannot be compared directly. For this reason, the difference between the detected packet arrival time (PAT) and the packet arrival time of the first transport stream packet of the stream object unit SOBU 5 is compared with the difference between the requested search time (ST) and the calculated value (S_S_APAT+x×Σ IAPAT) for fine search of the transport stream packet corresponding to the requested search time (ST).

The position A searched based upon the time information (S_S_APAT+x×Σ IAPAT) calculated using the incremental application packet arrival times (IAPATs), however, does not coincide with the actual start position A' of the stream object unit SOBU 5, as shown in FIG. 2. The offset between the transport stream packet position A detected by the fine search operation and the actual position A' results in a delay in the search operation.

As a result, additional information indicative of the offset value between A' and A (Offset_SZ in FIG. 2) is necessary for precisely searching for the position (s) of the transport stream packet corresponding to the requested search time (ST). It is not desirable, however, to add the additional information to every stream object unit (SOBU), which dramatically lowers the recording efficiency of the recording medium.

The digital data communication between the set top box 100 and the streamer 200 is conducted through an IEEE-1394 digital communication interface. The IEEE-1394 interface inserts a time stamp of a frequency of 24.576 MHz into each transport stream packet before transmitting the transport stream packets for guaranteeing real-time digital data communication.

As explained before, the streamer 200 also adds time stamps of a frequency of 27 MHz to the transport stream packets of the recorded data for presentation. Since the clock used by the streamer 200 differs from that used by the IEEE-1394 interface, the time information of the transport stream transmitted through the IEEE-1394 interface based upon a 24.576 MHz clock may become different from that of the streamer 200 based upon a 27 MHz clock, which may cause critical problems such as skipped presentation of video data.

SUMMARY OF THE INVENTION

It is an object of the present invention to provide a method and apparatus for creating and recording time information intended for precisely searching a recording medium for a requested packet stream unit. When recording received packet stream units on a recording medium, time information pertaining to each of the received packet stream unit is created and added to the corresponding packet stream unit. The format of the added time information is compatible with a search time requested by a user so that the timing error that may arise in search operations can be effectively eliminated.

It is another object of the present invention to provide a method and apparatus for creating and recording arrival time information of each packet stream unit so that the arrival time added to each of the received transport stream unit when recording received packet stream units is synchronized with the clock used in digital interfaces.

A method for recording time information for digital data streams in accordance with an embodiment of the invention comprises detecting the packet arrival time of each received transport stream packet and recording the detected packet arrival time in the format compatible with the format of a search time information.

A recording medium on which the time information for digital data streams in accordance with an embodiment of the present invention is recorded comprises a data area wherein packet arrival times and transport stream packets are recorded and being organized as stream objects, and a navigation data area wherein search time information the format of which is compatible with the packet arrival time is recorded.

These and other objects of the present application will become more readily apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFFERRED EMBODIMENTS

In order that the invention may be fully understood, preferred embodiments thereof will now be described with reference to the accompanying drawings.

Figure 7A:
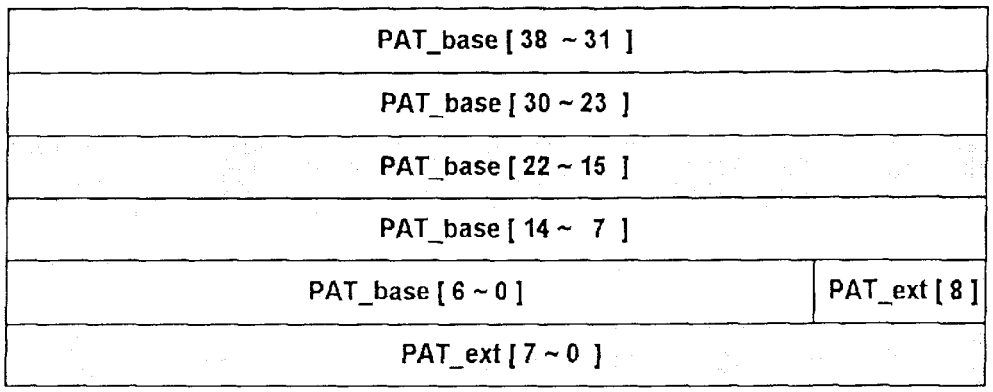
FIGS. 7A and 7B are tables showing the time information of a recorded data stream according to an embodiment of the present invention.
Figure 7B:
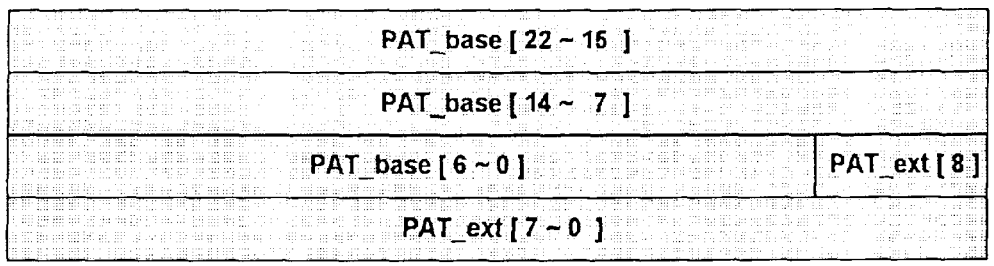

FIGS. 7A and 7B depict the data formats of the stream start application packet arrival time (S_S_APAT) and packet arrival time (PAT), respectively, in accordance with an embodiment of the invention.

Like a clock counting method and format thereof used when creating the digital data stream, the 6-byte stream start application packet arrival time (S_S_APAT) contained in the stream object general information (SOB_GI) comprises a 9-bit packet arrival time extension (PAT_ext) and a 39-bit packet arrival time base (PAT_base). The packet arrival time extension (PAT_ext) is a modulo-300 counter that is incremented at a rate of 27 MHz, whereas the packet arrival time base (PAT_base) is incremented at a rate of 90 kHz.

On the other hand, the packet arrival time (PAT) of a transport stream packet is 4-byte data comprising a 9-bit packet arrival time extension (PAT_ext) and 23-bit packet arrival time base (PAT_base). Like the stream start application packet arrival time (S_S_APAT), the packet arrival time extension (PAT_ext) is a modulo-300 counter that is incremented at a rate of 27 MHz and the packet arrival time base (PAT_base) is incremented at a rate of 90 kHz. The created packet arrival time (PAT) is included in each received transport stream packet to form stream object units to be recorded on a recording medium.

In consequence, the 4-byte packet arrival time (PAT) of a transport stream packet has the same format as the lower 4 bytes of the 6-byte stream start application packet arrival time (S_S_APAT) and so the lower 4-byte data of the stream start application packet arrival time (S_S_APAT) always coincides with one of the recorded 4-byte packet arrival times (PATs). Also, there is certainly a packet arrival time (PAT) coinciding with the lower 4-byte data of the search time (ST) requested by a user, the 6-byte search time (ST) comprising a packet arrival time base (PAT_base) and a packet arrival time extension (PAT_ext) specified by the MPEG format.

It is also possible to record the packet arrival time (PAT) of each transport stream packet as 6-byte data like the stream start application packet arrival time (S_S_APAT). When recording the packet arrival time (PAT), it is desirable to use a shorter data length, for example 4 bytes, to improve the recording efficiency of the recording medium. However, a shorter data length of the packet arrival time (PAT) inevitably leads to a reduced range of the number that the packet arrival time (PAT) can represent. It will be shown below that the reduced range is no obstacle to searching for a requested packet.

Figure 9:
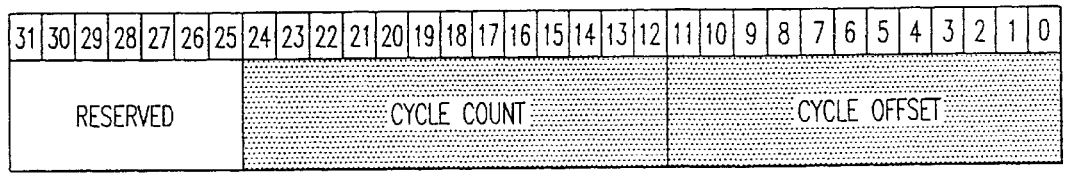
FIG. 9 is the data format of the time information contained in a data stream header transmitted through the IEEE-1394 interface.

The 4-byte packet arrival time (PAT) of a transport stream packet can represent up to 93.2 s (93.2=$2^{23}$/90 kHz) since its packet arrival time base (PAT_base) is 23-bit data that is incremented at a rate of 90 kHz. The packet arrival time (PAT) is reset to zero when the value reaches the limit, as shown in FIG. 9.

Figure 8:
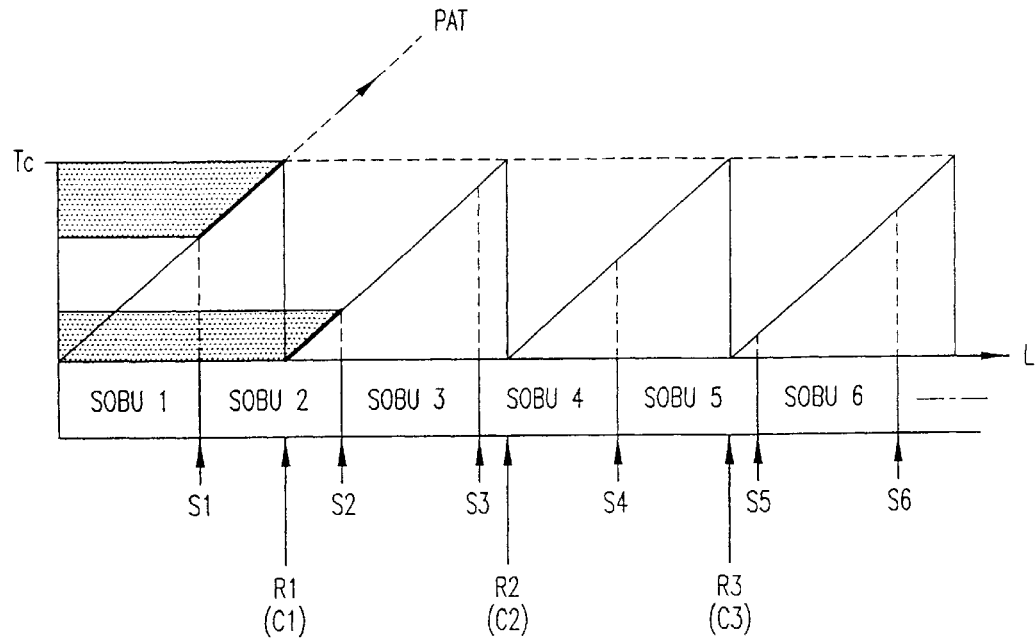
FIG. 8 is a pictorial representation showing the relation between stream object units (SOBUs) and time information according to an embodiment of the present invention.

FIG. 8 shows the way the packet arrival time (PAT) of each transport stream packet created when a digital data stream received by a set top box is recorded in the streamer 200. It is assumed that a stream object unit (SOBU) is made up of 32 sectors with each sector being 2048 bytes and the transfer rate of the data stream is 10 kbps. Hence, the time that elapses to record a stream object unit (SOBU) is 52.4 s (52.4=32 sectors×2048 byte/10 Kbps) and the packet arrival time (PAT) is reset at 93.2 s intervals. In other words, a stream object unit is created every 52.4 s and the reset carry (PAT_carry) of the packet arrival time (PAT) is created every 93.2 s (93.2=$2^{23}$/90 kHz). As a result, the packet arrival times (PATs) of all transport stream packets belonging to a stream object unit (SOBU) have mutually exclusive values as long as the transfer rate of the digital data stream exceeds 10 Kbps.

Figure 2:
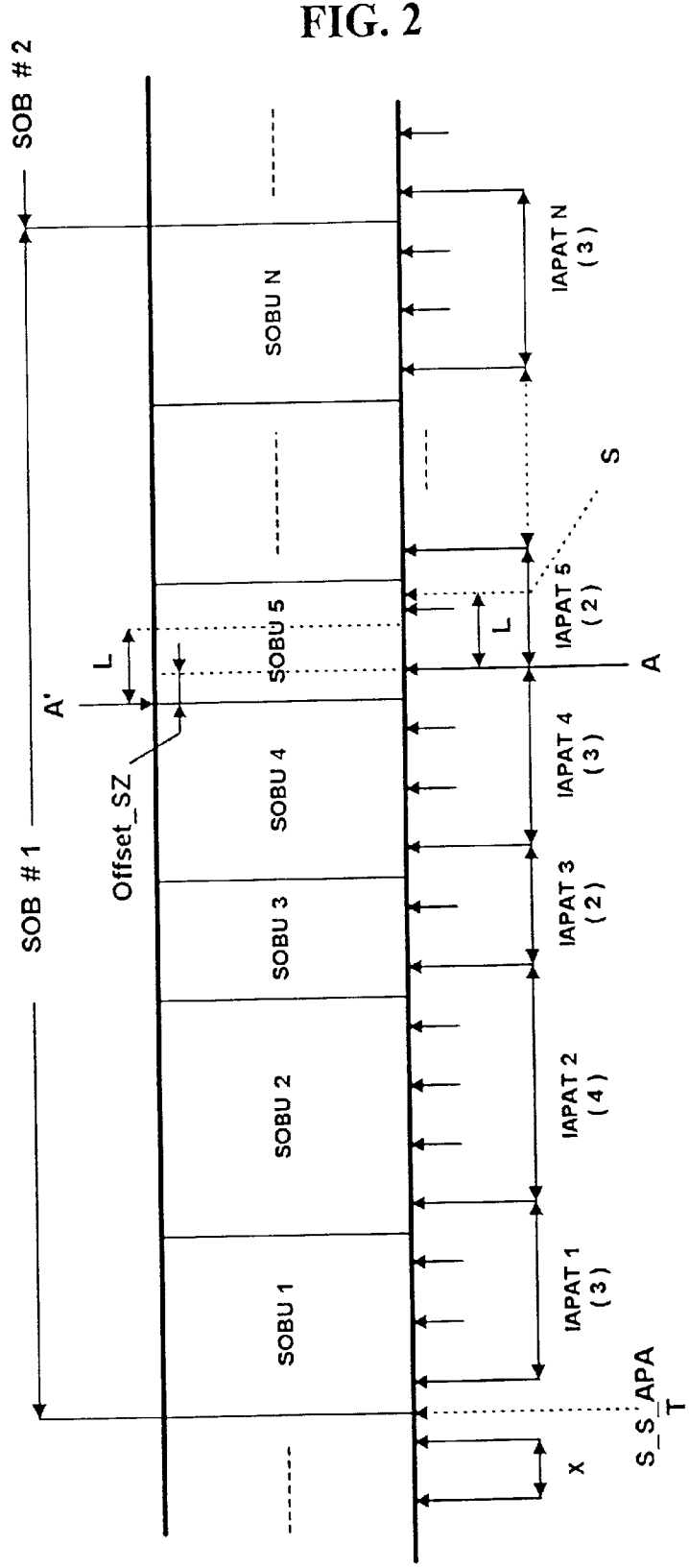
FIG. 2 is a pictorial representation of the process of creating and recording the management information of a digital data stream according to a conventional method.
Figure 3:
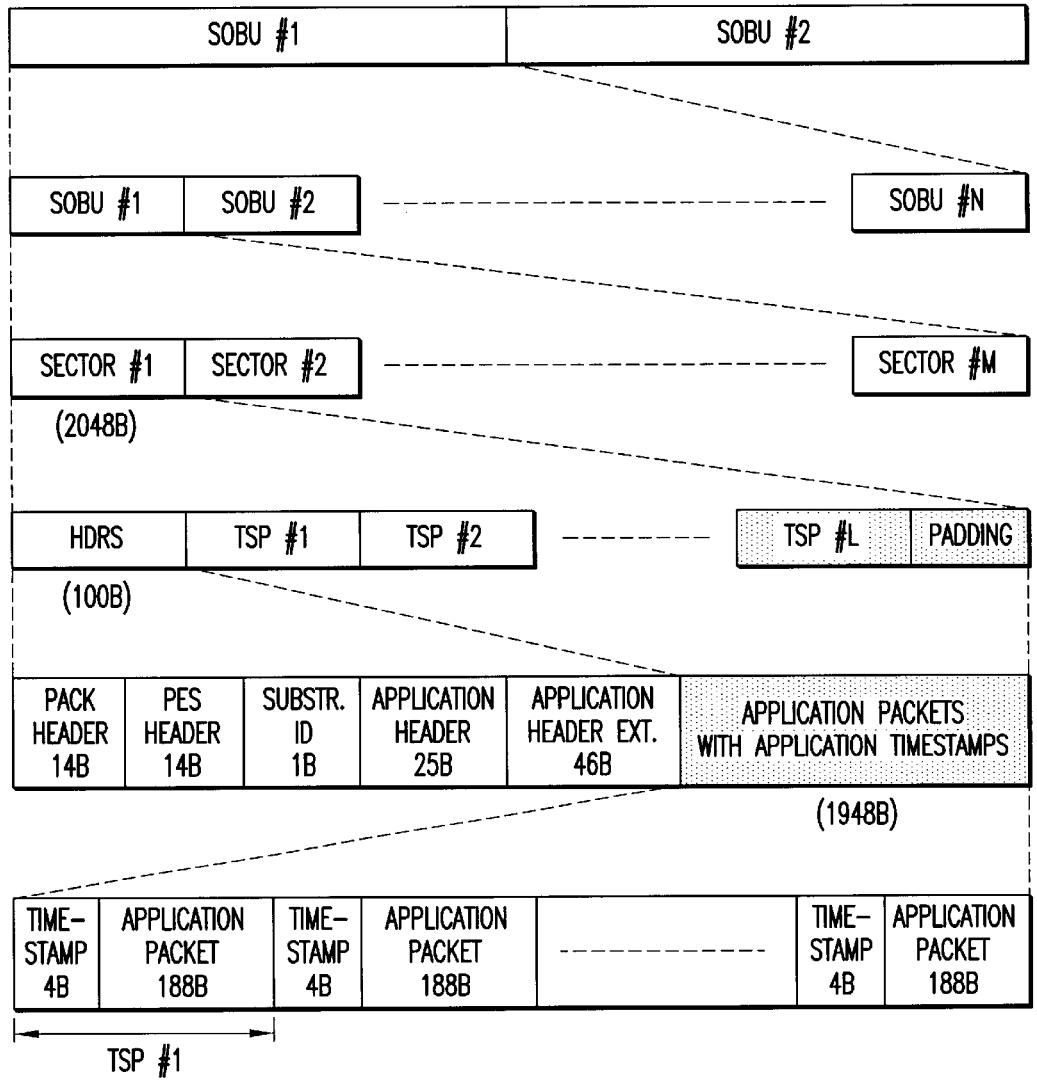
FIG. 3 is a pictorial representation showing the hierarchical structure of a general recorded digital data stream.
Figures 4, 5:
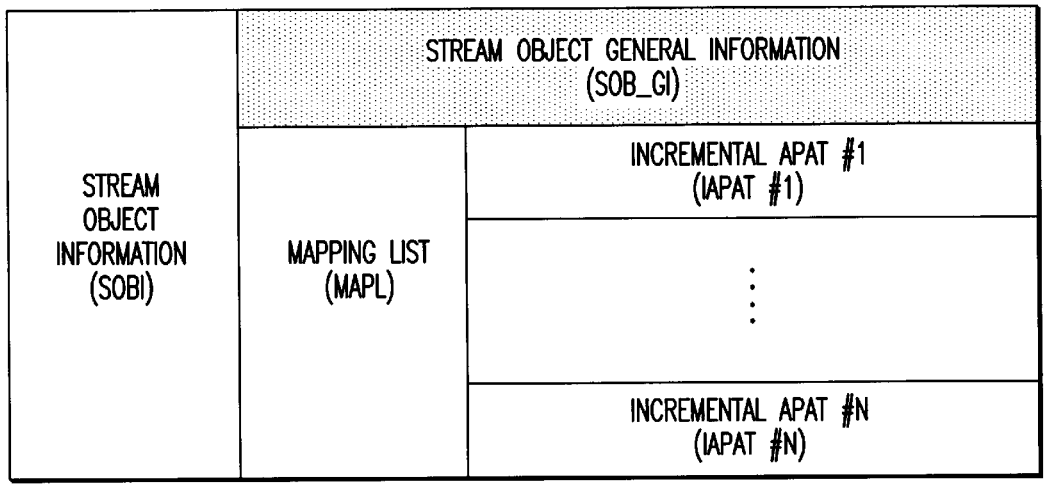
FIG. 4 is a table showing the management information of a general recorded data stream.
FIG. 5 is a table showing a part of the management information of a general recorded data stream in detail.
Figure 6A:
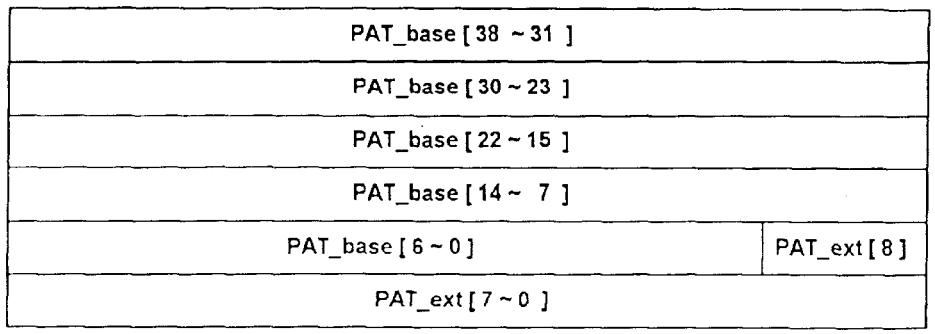
FIGS. 6A and 6B are tables showing the time information of a general recorded data stream.
Figure 6B:
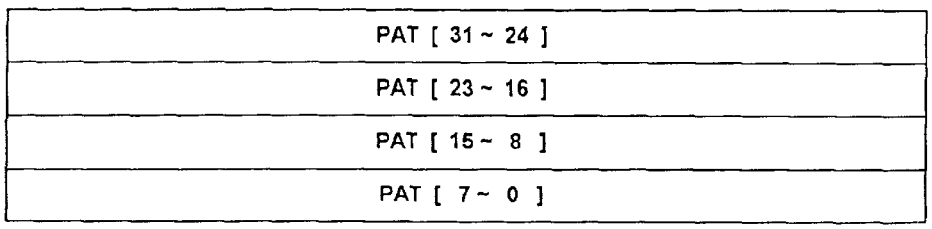

The method for searching for the position (s) of a transport stream packet corresponding to a search time (ST)

requested by a user from the data stream recorded as shown in FIG. 8 will be explained with reference to FIG. 2. First, the stream start application packet arrival time (S_S_APAT) contained in the stream object general information (SOB_GI) of each stream object (SOB) is compared with the requested search time (ST) and a stream start application packet arrival time (S_S_APAT) that is closest to but does not exceed the request search time (ST) is detected. Referring to the mapping list (MAPL) of the stream object SOB #1 corresponding to the detected stream start application packet arrival time (S_S_APAT), the incremental packet arrival times (IAPAT 1~4) contained in the mapping list (MAPL) are summed up. The sum value is multiplied by the unit time (x) and added to the stream start application packet arrival time (S_S_APAT). The procedure is repeated until the calculated value (S_S_APAT+x(Σ IAPAT) approaches the requested search time (ST) without exceeding it. In FIG. 2, the summation and multiplication is repeated to include IAPAT 4 because the calculated value (S_S_APAT+x(Σ IAPAT) exceeds the search time (ST) if the calculation continues to IAPAT 5. The stream object corresponding to the calculated value is SOBU 5, which corresponds to the upper 2-byte data of the search time (ST) requested by a user.

From the start position A' of the searched stream object SOBU 5, the 4-byte packet arrival time (PAT) of each transport stream packet is detected. The detected packet arrival times (PATs) are compared with the lower 4-byte data of the search time (ST) requested by a user to find the transport stream packet (TS) the packet arrival time (PAT) of which coincides with the lower 4-byte data of the search time (ST).

Based upon the stream start application packet arrival time (S_S_APAT) and incremental application packet arrival time (IAPAT) in the mapping list (MAPL), the stream object unit SOBU 5 corresponding to the upper 2-byte data of the requested search time is detected first. Then, the packet arrival time (PAT) of each transport stream packet constituting the stream object unit SOBU 5 is detected and compared with the lower 4-byte data of the search time (ST) to find a desired transport stream packet. By the 2-step procedure, the transport stream packet located in the recording position (S) corresponding exactly to the search time (ST) can be detected.

So far, the method for creating and recording the packet arrival time (PAT) of each transport stream packet on a recording medium has been explained with reference to an embodiment. In the embodiment, the format of the created packet arrival time is compatible with that of the search time information recorded on the recording medium or requested by a user. In another embodiment of the invention to be explained from now, the packet arrival time (PAT) is created in such a way that the packet arrival time (PAT) is counted by count means comprising a bigger-unit time field and a smaller-unit time field so that the format of the packet arrival time (PAT) is compatible with the clock format used in digital interfaces.

FIG. 9 is a pictorial representation of the syntax of a time stamp used to transfer real-time data through the IEEE-1394 communication interface. The time stamp comprises a 12-bit cycle offset field, a 13-bit cycle count field, and a 7-bit reserved field. The cycle offset field is incremented at a rate of 24.576 MHz and can represent up to 125 μs by using 0~BFF(h), whereas the cycle count field is incremented once every 125 μs and can represent up to 1 s by using 0~1F3F(h). When the cycle offset field is reset to zero after counting up to BFF(h), a carry is generated and the cycle count is incremented by 1.

Figure 10:
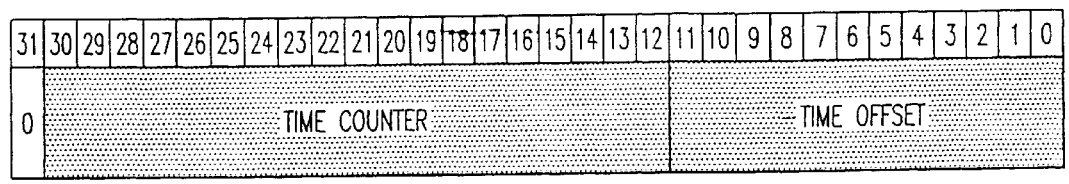
FIG. 10 is the data format of the packet arrival time of a digital data stream according to another embodiment of the present invention.

FIG. 10 shows the data format of the packet arrival time (PAT) in accordance with the present invention. The format is intended for synchronizing the packet arrival time (PAT) with the system clock of the IEEE-1394 communication interface whose counting format is shown in FIG. 9 and comprises a 12-bit time offset field, a 19-bit time counter field, and 1-bit flag.

The time offset is incremented at a rate of 27 MHz, which is the streamer clock. Like the cycle offset in the IEEE-1394 interface, it can represent up to 125 μs by using 0~D/2E(h). The time counter field is incremented at 125 μs intervals and can represent up to 65 s. Each time the time offset field is reset after counting up to D2E(h), a carry is generated and the time counter field is incremented by 1.

The 1-bit flag indicates whether or not a program clock reference (PCR) is contained in the corresponding transport stream packet. In this example, the value "1" indicates that the transport stream packet contains a program clock reference. On the contrary, the value "0" indicates that the corresponding transport stream packet only contains the time counter and time offset of the packet arrival time created based upon the streamer clock.

Figure 11:
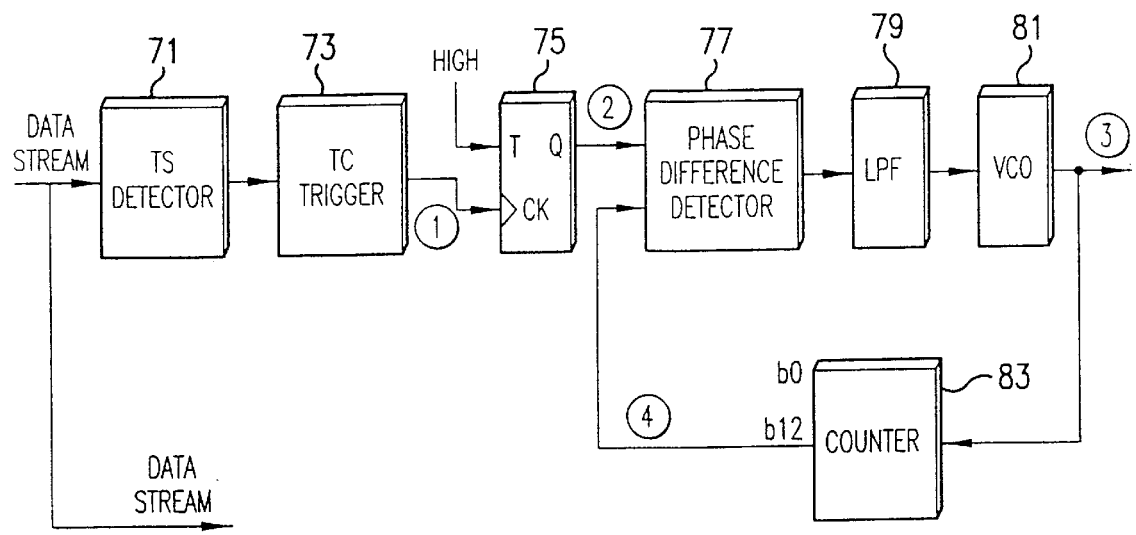
FIG. 11 is a block diagram of an apparatus for synchronizing two different clock using the time information of a digital data stream according to another embodiment of the present invention.

Referring to FIG. 11, a counter 83 cyclically counts the output pulse of voltage-controlled oscillator (VCO) 81 from 0 to 3374 using lower 12 bits (b11~b0).

Figure 1:
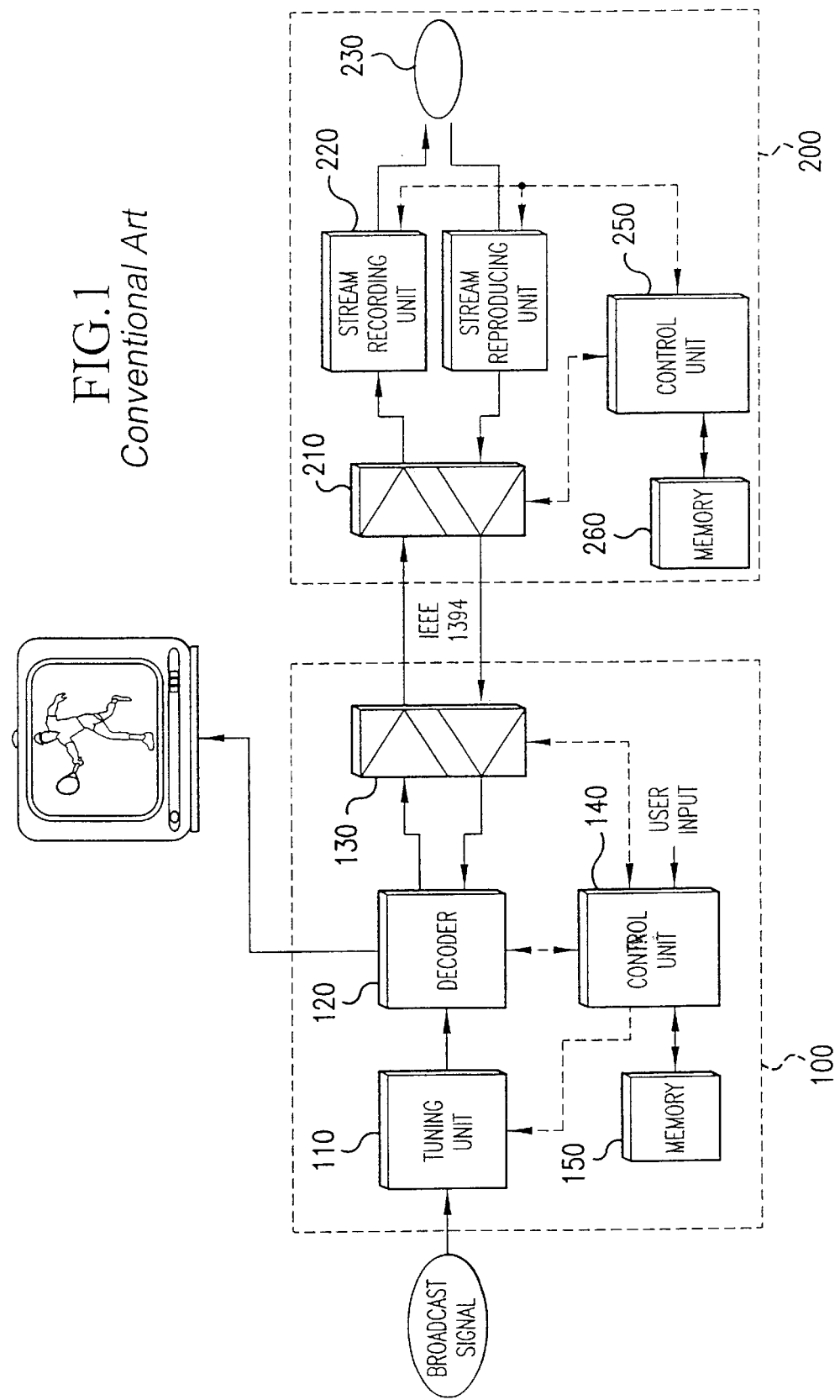
FIG. 1 is a block diagram of an apparatus in which a conventional method for creating and recording the management information of a digital data stream can be employed.

When digital data is outputted from a digital receiving processing unit 210 in the streamer 200 (FIG. 1), a time stamp detector 71 detects the time stamp of the IEEE-1394 interface contained in each transport stream packet and transfers the detected time stamp to a time counter trigger unit 73. Time counter trigger unit 73 generates a pulse such as ① shown in FIG. 12 each time the state of the least significant bit (b12) of the time counter field of FIG. 10 changes from "1" to "0" or from "0" to "1".

Figure 12:
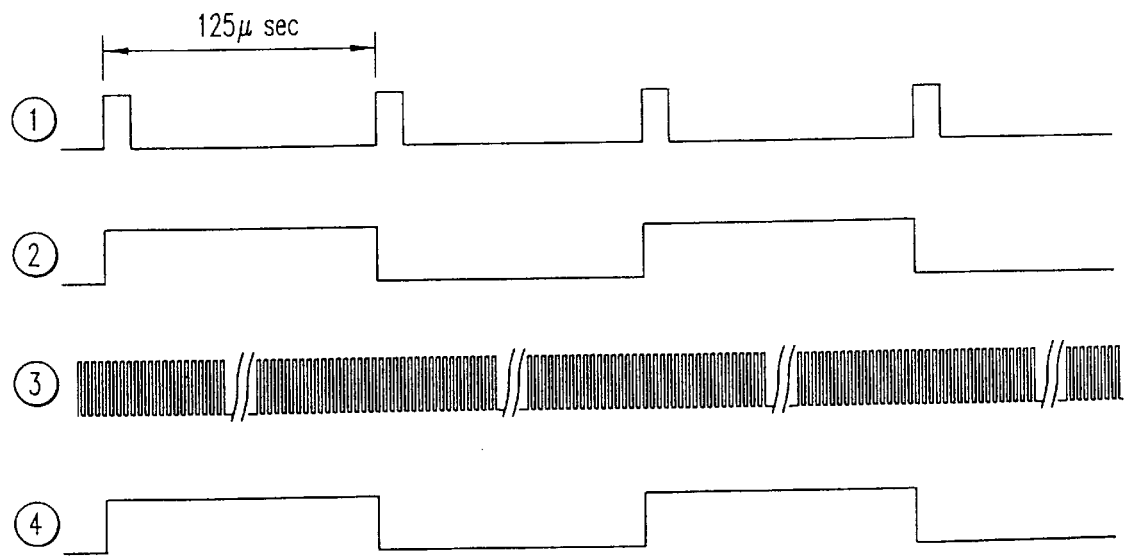
FIG. 12 is a timing diagram of certain nodes of the apparatus shown in FIG. 11.

The output pulse of time counter trigger unit 73 is connected to the clock of a T flip-flop 75. T flip-flop 75 toggles the output Q on the positive edge of the clock pulse. The output Q of T flip-flop 75, which is a 4 kHz pulse figured as ② in FIG. 12, is connected to an input of a phase difference detector 77. The 13th bit (b12) of counter 83 is also a 4 kHz pulse and is connected to another input of phase difference detector 77. Phase difference detector 77 compares the phases of the two input pulses and outputs an error signal corresponding to the phase difference. The high-frequency components of the error signal is filtered by a low-pass filter 79 and the low-pass filtered error signal is applied to the voltage-controlled oscillator 81. In response to the filtered error signal, the voltage-controlled oscillator 81 adjusts its 27 MHz oscillation frequency.

In consequence, the packet arrival time of each transport packet transmitted based upon the time stamps of the IEEE-1394 interface added to the header of the transport stream packet is created and recorded based upon a clock of 27 MHz synchronized with the time stamp clock of 24.576 MHz, thereby preventing the time intervals between two consecutive transport packets from being distorted by transmission.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A recording medium for recording time information of digital data streams received through an interface, the recording medium comprising:

data object units recorded therein, wherein the data object units are created by adding count values of a bigger-unit time field and a smaller-unit time field at the time each unit of a digital data stream is received, to the corresponding unit of the digital data stream, and wherein the count values are generated such that the smaller-unit time field is reset when the count value of the smaller-unit time field reaches a predetermined value and the bigger-unit time field is incremented by 1 when the smaller-unit time field is reset.

2. The recording medium set forth in claim 1, wherein a predetermined number of the data object units are recorded on the recording medium as a stream object unit.

3. The recording medium set forth in claim 1, wherein the predetermined value is smaller than a maximum value that said smaller-unit time field can represent.

4. The recording medium set forth in claim 1, wherein the predetermined value amounts to a time period during which said bigger-unit time field specified by the interface is incremented by 1.

5. The recording medium set forth in claim 1, wherein a maximum time length that said bigger-unit time field can represent is less than a maximum time length of a navigation time information needed for accessing the data object units.

6. The recording medium of claim 1, wherein the data object units pertain to video data.

7. The recording medium of claim 1, wherein the recording medium is a DVD.

* * * * *